(12) United States Patent
Keall et al.

(10) Patent No.: US 8,854,384 B2
(45) Date of Patent: Oct. 7, 2014

(54) METHOD AND SYSTEM FOR PROCESSING PIXELS UTILIZING SCOREBOARDING

(75) Inventors: Gary Keall, Long Clawson (GB); Giles Edkins, Cambridge (GB); Eben Upton, Cambridge (GB); James Adams, Cambridge (GB)

(73) Assignee: Broadcom Corporation, Irvine, CA (US)

(*) Notice: Subject to any disclaimer, the term of this patent is extended or adjusted under 35 U.S.C. 154(b) by 799 days.

(21) Appl. No.: 12/953,756

(22) Filed: Nov. 24, 2010

(65) Prior Publication Data

US 2011/0242113 A1   Oct. 6, 2011

Related U.S. Application Data

(60) Provisional application No. 61/321,244, filed on Apr. 6, 2010.

(51) Int. Cl.
| | | |
|---|---|---|
| *G06T 1/00* | (2006.01) | |
| *G06F 9/38* | (2006.01) | |
| *G06T 11/40* | (2006.01) | |
| *G06F 15/78* | (2006.01) | |
| *G06F 9/52* | (2006.01) | |

(52) U.S. Cl.
CPC ............ *G06F 15/7807* (2013.01); *G06F 9/522* (2013.01); *G06F 9/3857* (2013.01); *G06T 11/40* (2013.01)

USPC .......................... 345/522; 345/535; 345/505

(58) Field of Classification Search
CPC ..... G06T 1/20; G06T 15/005; G06T 2210/52; G06T 1/60; G09G 5/39; G09G 5/393; G09G 5/363; G06F 9/3851; G06F 9/3889; G06F 9/3855
USPC .................. 345/501, 505, 506, 531, 535, 545
See application file for complete search history.

(56) References Cited

U.S. PATENT DOCUMENTS

2008/0024506 A1* 1/2008 Lindholm et al. ............ 345/506

* cited by examiner

*Primary Examiner* — Xiao Wu
*Assistant Examiner* — Scott E Sonners
(74) *Attorney, Agent, or Firm* — Brinks Gilson & Lione

(57) ABSTRACT

In a graphics processing device, a plurality of processors write fragment shading results for order-dependent data to a buffer, according to the order in which the data is received. Fragment shading results for order-neutral data is written to the buffer one batch at a time. The order-dependent data comprises spatially overlapping data. Order-neutral data may not overlap. A scheduler controls the order of reception of one batch of data at a time by the processors. The order for receiving the order-dependent data may be determined. The plurality of processors may process the data in parallel. A writing order for writing results to a buffer from the processing in parallel, may be enforced. A portion of the processors may be instructed to wait before writing results to the buffer in a specified order. Processors signal when writing results to the buffer is complete.

20 Claims, 9 Drawing Sheets

FIG. 4C

| | | LIST |
|---|---|---|
| 432 → | Tile (1,0) | A | (12, 20, 9) |
| 434 → | Tile (1,2) | A<br>C | (12, 20, 9)<br>(30, 27, 41) |

TABLE OF VERTICES

| | | | | | |
|---|---|---|---|---|---|
| 9 | 12 | 20 | 27 | 30 | 41 |
| $a_2$ | $a_0$ | $a_1$ | $c_1$ | $c_0$ | $c_2$ |
| ... | ... | ... | ... | ... | ... |

↑ 452   ↑ 454   ↑ 456   ↑ 458   ↑ 460   ↑ 562

450

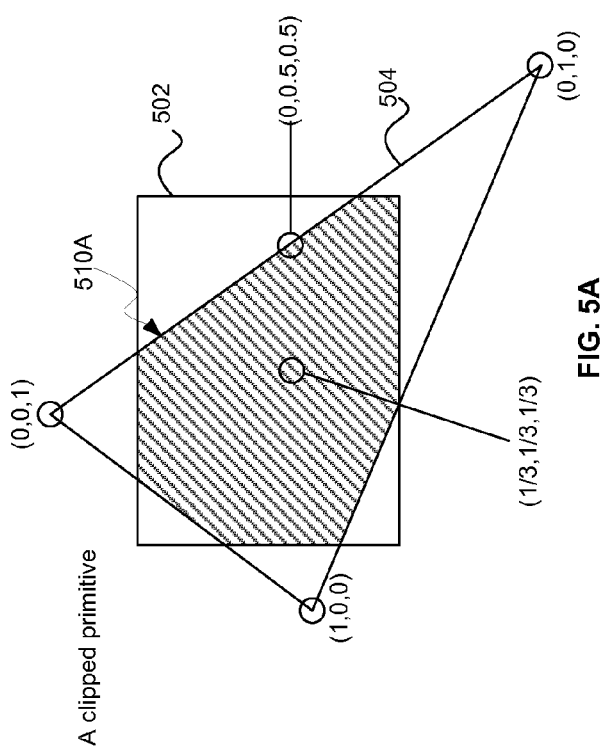
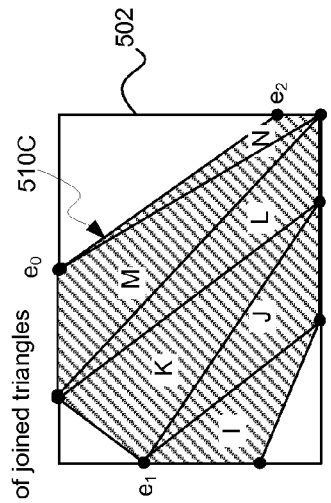
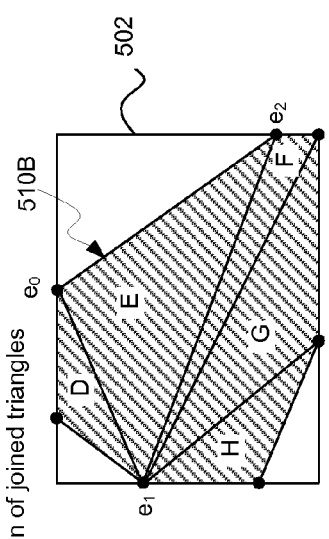
FIG. 5A
FIG. 5B
FIG. 5C

US 8,854,384 B2

METHOD AND SYSTEM FOR PROCESSING PIXELS UTILIZING SCOREBOARDING

CROSS-REFERENCE TO RELATED APPLICATIONS AND INCORPORATION BY REFERENCE

This application makes reference to, claims priority to, and claims the benefit of U.S. Provisional Application Ser. No. 61/321,244, filed on Apr. 6, 2010, which is incorporated herein by reference in its entirety.

This application also makes reference to: U.S. patent application Ser. No. 12/686,800, which was filed on Jan. 13, 2010;
U.S. patent application Ser. No. 12/953,128 which was filed on Nov. 23, 2010;
U.S. patent application Ser. No. 12/868,192, which was filed on Aug. 25, 2010;
U.S. patent application Ser. No. 12/952,739 which was filed on Nov. 24, 2010;
U.S. patent application Ser. No. 12/942,626, which was filed on Nov. 9, 2010;
U.S. patent application Ser. No. 12/869,900, which was filed on Aug. 27, 2010;
U.S. patent application Ser. No. 12/868,508, which was filed on Aug. 25, 2010; and
U.S. patent application Ser. No. 12/835,522, which was filed on Apr. 22, 2010.

Each of the above stated applications is hereby incorporated herein by reference in its entirety.

FIELD OF THE INVENTION

Certain embodiments of the invention relate to communication systems. More specifically, certain embodiments of the invention relate to processing pixels utilizing scoreboarding.

BACKGROUND OF THE INVENTION

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for processing pixels utilizing scoreboarding, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4B is a block diagram that illustrates exemplary vertex information that may be utilized during a tile binning phase and/or during a tile rendering phase, in accordance with an embodiment of the invention.

FIG. 4C is a block diagram that illustrates exemplary primitive and/or vertex index information that may be encoded during a binning phase, in accordance with an embodiment of the invention.

FIG. 5A is a block diagram that illustrates an exemplary primitive that extends beyond the borders of a viewport and/or of a tile, in accordance with an embodiment of the invention.

FIG. 5B is a block diagram that illustrates an exemplary clipped primitive that is represented as a plurality of fanned triangles that comprise shared vertices, in accordance with an embodiment of the invention.

FIG. 5C is a block diagram that illustrates an exemplary clipped primitive that is represented as a strip of triangles comprising shared vertices, in accordance with an embodiment of the invention.

DETAILED DESCRIPTION OF THE INVENTION

Certain embodiments of the invention can be found in a method and system for processing pixels utilizing scoreboarding. A graphics processing device that may comprise a plurality of processors may be operable to process in parallel, batches of information for fragment shading. Fragment shading may be referred to as pixel-fragment shading and/or pixel shading. In instances when the batches of information comprise order-dependent data, the processing may comprise writing results from the processing to a buffer in an order that corresponds to an order in which the batches of order-dependent data are received for processing. In instances when the batches of information comprise order-neutral information, the processing may comprise writing results from the processing in any order to a buffer. The processing results may comprise color shaded pixel fragments. The order-dependent data may comprise spatially overlapping data. The order-neutral data may not comprise spatially overlapping data. The graphic processing device may comprise an integrated circuit (IC) or a chip in which the plurality of processors may be integrated on a single substrate of the IC or chip.

A scheduler may be utilized to control the order in which the batches of order-dependent data and/or the order-neutral data are received by the plurality of processors. The batches of order-dependent data and/or the batches of order-neutral data may be received one at a time by any of the plurality of processors. The order in which the batches of order-dependent data are received by each of the plurality of processors may be determined. All or a portion of the plurality of processors may process in parallel the one or more batches of order-dependent data and/or the one or more of the batches of order-neutral data. A writing order for writing results to a buffer from the processing in parallel may be enforced. One or more of the plurality of processors may be operable to write the results from processing in parallel, to the buffer in a specified order. One or more of the plurality of processors may be operable to wait before writing the results from processing in parallel, to the buffer in a specified order. One or more of the plurality of processors may be operable to send and/or receive a signal when one of the plurality of processors has completed writing the results to the buffer. In this manner, a scoreboarding technique may be utilized to process pixels.

Figure 1A:
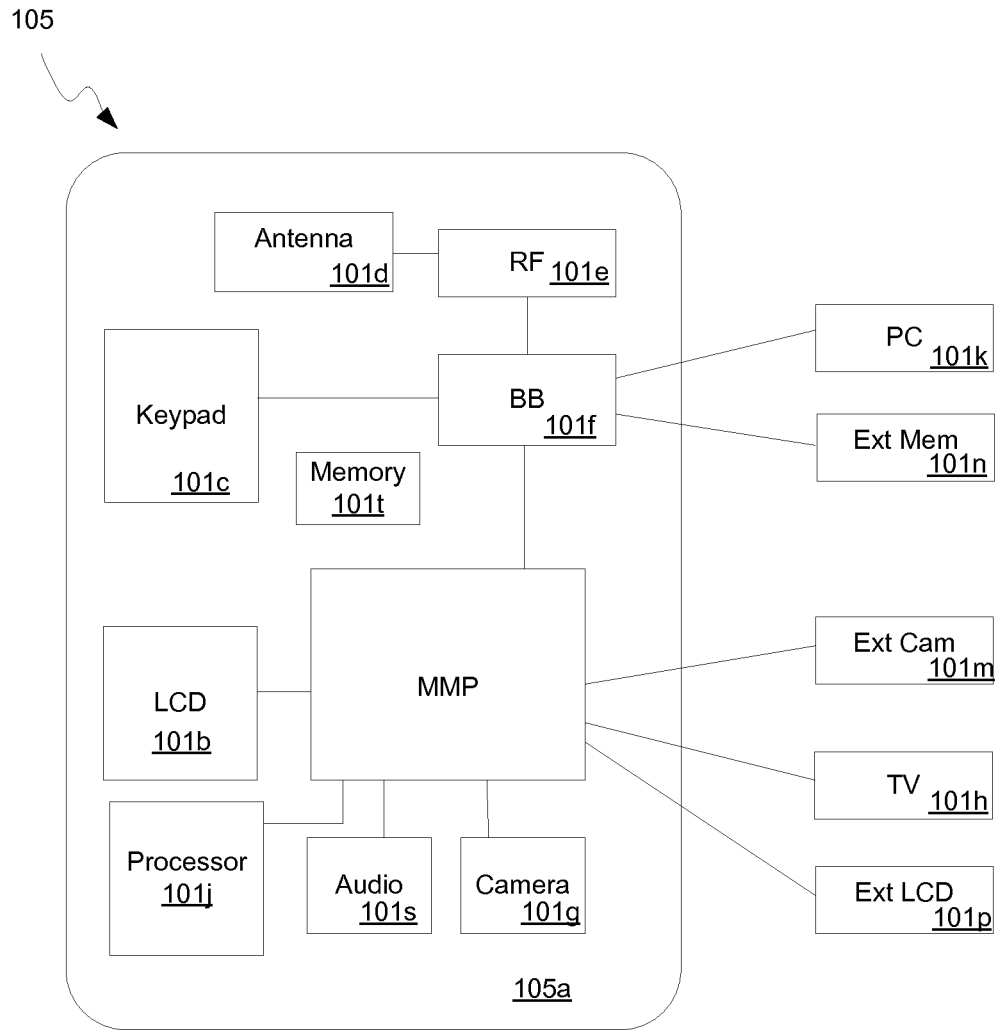
FIG. 1A is a block diagram of an exemplary multimedia system that is operable to process pixels utilizing scoreboarding, in accordance with an embodiment of the invention.

FIG. 1A is a block diagram of an exemplary multimedia system that is operable to process pixels utilizing scoreboarding, in accordance with an embodiment of the invention. Referring to FIG. 1A, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, a memory 101t, a processor 101j an antenna 101d, an audio block 101s, a radio frequency (RF) block 101e, a baseband processing block 101f, an LCD display 101b, a keypad 101c, and a camera 101g. The MMP 101a may be communicatively coupled to the memory 101t and/or the external memory 101n.

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD display 101p.

The MMP 101a may comprise suitable circuitry, logic, interfaces and/or code that may be operable to perform tile based, two dimensional (2D) and/or three dimensional (3D) graphics rendering. The graphics rendering may be performed in two phases, namely a tile binning phase and a tile rendering phase. The tile binning phase may comprise coordinate-only vertex shading, whereas the pixel rendering phase may comprise full vertex shading.

3D graphics data represented in modeling space may comprise a plurality of geometric primitives. During the coordinate shading step of the tile binning phase, geometric primitives in 3D modeling space are transformed to a two dimensional screen space. The two dimensional screen space may be divided into a plurality of regions. The regions may be referred to as tiles or bins. The MMP 101a may determine which primitives, or portions of a primitive, that overlap ones of the plurality of tiles (or bins). The MMP 101a may generate a tile list for each tile. A tile list may comprise information about the primitives that overlap a corresponding tile (or bin). Once the primitives are associated with a bin in a tile list, the second phase, comprising tile rendering may be performed to render pixels with color, light, and/or texture, for example.

The tile based graphics rendering processes may be managed utilizing control lists. The control lists may comprise one or more of processing instructions, register settings, tile lists and/or primitive data for example. The MMP 101a may render the primitive data by stepping through the control lists. Register settings and instructions from the control lists may be utilized to configure the MMP 101a and to manage the flow of data to various modules in the MMP 101 and/or to external memory, during processing. The MMP 101a may perform shading on data according to the instructions in the control list and may store output in the memory 101t and/or in the external memory 101n for example. In addition, tile lists that may be utilized in the control lists, may be stored in the memory 101n.

The MMP 101a may be operable to perform fragment shading of a plurality of pixel fragment batches in parallel and may write results to a local tile buffer. For example, the MMP 101a may perform fragment shading and may write fragment color values to the buffer. The MMP 101a may utilize a scoreboarding system that may enable the MMP 101a to write color values that may be processed in parallel to the buffer in a correct rendering order. When a batch of data to be shaded comprises pixel fragments that overlap fragments in one or more earlier batches of data that are yet to be written to a buffer, shaded results from the batches of data may be written to the buffer in a specified order. In various exemplary embodiments of the invention, parallel processing shader programs may perform a "scoreboard wait" prior to accessing the buffer memory to prevent writing to certain buffer locations that have yet to be written by other parallel processing shading programs that started earlier. The parallel processing shader programs may send an "unlock scoreboard" signal when they have finished writing a batch of data to the buffer that may enable subsequent writes to the buffer by other shader programs. In this manner, overlapping pixel fragments may be rendered in a correct order. When a batch of data does not comprise pixel fragments that overlap with one or more other batches of data that are still being shaded, the batch of data may be written to the buffer in any suitable order.

The processor 101J may comprise suitable circuitry, logic, interfaces, and/or code that may be operable to control processes in the mobile multimedia system 105. Although not shown in FIG. 1A, the processor 101J may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

In an embodiment of the invention, the MMP 101A may be operable to perform tile based pixel rendering of 2D and/or 3D graphics data in parallel. The 2D and/or 3D graphics data may be received from the PC 101k, for example. The MMP 101a may perform tile based pixel rendering in two phases. The first phase may comprise tile binning and the second phase may comprise tile rendering. The tile binning phase may comprise partial vertex shading and generating a list of primitives for each tile. The generated lists may be referred to as tile lists. The tile rendering phase may comprise utilizing ones of the tile lists to render pixels from the geometric primitives located within corresponding ones of the tiles. The pixel fragments may be processed in parallel by the MMP 101A and may be written to a local tile buffer. Parallel processing fragment shader programs may utilize a scoreboarding system to control the order of access to the tile buffer by shader programs. Wait and unlock signals may enable batches of pixel fragment data that are processed in parallel to be written to memory in a specified order.

In an embodiment of the invention, the MMP 101A may be operable to process video signals received wirelessly or generated by an imaging sensor, such as the external camera 101m or the camera 101g, for example. The MMP 101a may process video signals within a plurality of video modules, as described further with respect to FIG. 1B.

Figure 1B:
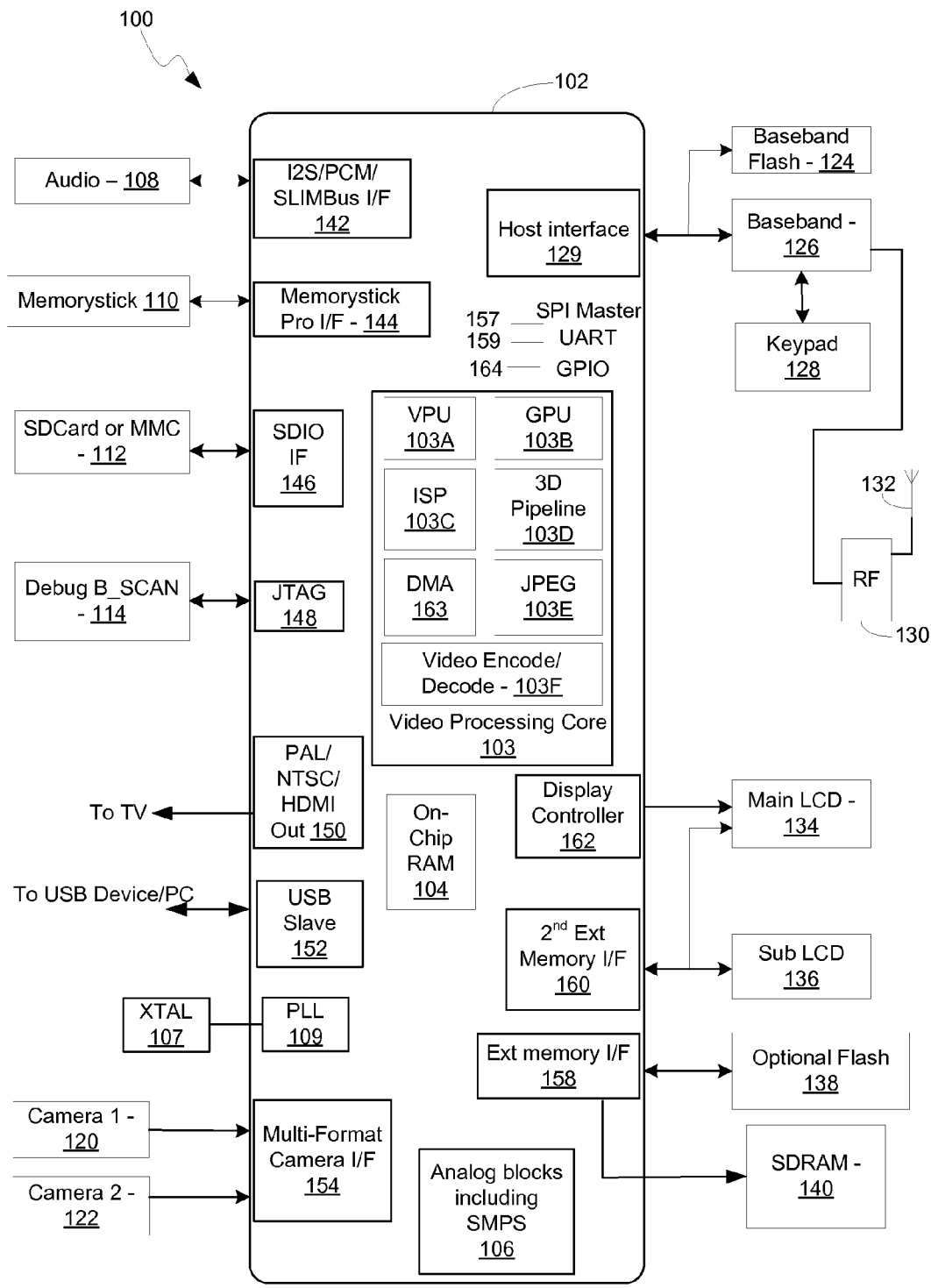
FIG. 1B is a block diagram of an exemplary multimedia processor comprising a video processing core that is operable to process pixels utilizing scoreboarding, in accordance with an embodiment of the invention.

FIG. 1B is a block diagram of an exemplary multimedia processor comprising a video processing core that is operable to process pixels utilizing scoreboarding, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a graphic processing unit 103B, an image sensor pipeline (ISP) 103C, a 3D pipeline 103D, a direct memory access (DMA) controller 163, a joint photographic experts group (JPEG) encoding/decoding module 103E, and a video encoding/decoding module 103F. The mobile multimedia processor 102 may also comprise on-chip RAM 104, an analog block 106, a phase locked loop (PLL) 109, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable logic, circuitry, interfaces, and/or code that may be operable to perform video processing of data. The on-chip RAM 104 and the SDRAM 140 comprise suitable logic, circuitry, interfaces and/or code that may be adapted to store data such as image or video data. For example, the on-chip RAM 104 and/or the SDRAM 140 may be operable to store tables of vertex attributes and/or one or more tile lists that may be read into the video processing core 103 and/or the 3D pipeline 103d during tile based pixel rendering. The tile lists may be placed within a control list or may be linked to from a control list.

The image sensor pipeline (ISP) 103C may comprise suitable logic, circuitry, interfaces and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable logic, circuitry, interfaces and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example. In this regard, the 3D pipeline 103D may be operable to perform operations for the tile based pixel rendering in parallel. The pixel rendering may comprise two phases, a binning phase and a tile rendering phase. The 3D pipeline 103D may generate a plurality of tile lists during the binning phase. A tile list may comprise an index list that may point to vertex attributes for a batch of data to be rendered. Control lists for data flow, tile lists and/or the table of vertex attributes may be stored in the on-chip RAM 104 and/or in the SDRAM 140, for example. The 3D pipeline 103D may read the control lists, the tile lists and/or the vertex attributes and may perform the pixel rendering phase for each tile. A plurality of batches of pixel data may be processed by parallel pixel shader programs in the 3d pipeline, for example, in parallel processors. Output from the parallel pixel shader programs may be written to a buffer in the 3D pipeline 103D in a specified order. A scoreboarding technique utilizing wait and unlock signals may be utilized to control access to the buffer. Once the batches of data are shaded, the shaded pixels may be stored in main memory, for example, the RAM 104 and/or in the SDRAM 140.

The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

The analog block 106 may comprise a switch mode power supply (SMPS) block and an on-chip SMPS controller, which may be adapted to generate its core voltage. The core voltage may be software programmable according to, for example, speed demands on the mobile multimedia processor 102, allowing further control of power management.

The PLL 109 may comprise suitable logic, circuitry, interfaces, and/or code that may be operable to generate suitable clock signals, 195 kHz-200 MHz clocks, for example, for external devices. A crystal, the XTAL 107, may be coupled to the PLL 109 and may comprise suitable logic, circuitry, interfaces, and/or code that may be operable to generate a stable oscillating signal for the PLL 109. Other voltages and clock speeds may be utilized depending on the type of application. The mobile multimedia processor 102 may comprise a plurality of power modes of operation, for example, run, sleep, hibernate and power down.

The audio block 108 may comprise suitable logic, circuitry, interfaces, and/or code that may be operable to communicate with the mobile multimedia processor 102 via an inter-IC sound ($I^2S$), pulse code modulation (PCM), serial low-power inter-chip media bus (SLIMBus), audio codec (AC'97) interface 142 or other suitable interface, for example. In the case of an AC'97 and/or an $I^2S$ interface, suitable audio controller, processor and/or circuitry may be operable to provide AC'97 and/or $I^2S$ audio output respectively, in either master or slave mode. In the case of the PCM interface, a suitable audio controller, processor and/or circuitry may be operable to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1B).

The mobile multimedia device 100 may comprise at least one portable memory input/output (I/O) block. In this regard, the memorystick block 110 may comprise suitable logic, circuitry, interfaces, and/or code that may be operable to communicate with the mobile multimedia processor 102 via a memorystick pro interface 144, for example. The SD card block 112 may comprise suitable logic, circuitry, interfaces, and/or code that may be operable to communicate with the mobile multimedia processor 102 via a SD input/output (I/O) interface 146, for example. A multimedia card (MMC) may also be utilized to communicate with the mobile multimedia processor 102 via the SD input/output (I/O) interface 146, for example. The mobile multimedia device 100 may comprise other portable memory I/O blocks such an xD I/O card.

The debug block 114 may comprise suitable logic, circuitry, interfaces, and/or code that may be operable to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC)/high definition multimedia interface (HDMI) TV output I/F 150 may be utilized for communication with a TV, and the universal serial bus (USB) 1.1, or other variant thereof, slave port I/F 152 may be utilized for communications with a PC, for example. The cameras 120 and/or 122 may comprise suitable logic, circuitry, interfaces, and/or code that may be operable to generate images and/or HD video and communicate with the mobile multimedia processor 102 via a multi-format raw/CCIR 601 camera interface 154, for example. The camera I/F 154 may also be used, for example, to connect the mobile multimedia processor 102 to a mobile TV front end.

The mobile multimedia processor 102 may also comprise a plurality of serial interfaces, such as the USB I/F 152, a serial peripheral interface (SPI) 157, and a universal asynchronous receiver/transmitter (UART) I/F 159 for Bluetooth or IrDA. The SPI master interface 157 may comprise suitable circuitry, logic, and/or code and may be utilized to control image sensors. Two chip selects may be provided, for example, and the interface may work in a polled mode with interrupts or via a DMA controller 163. In another embodiment of the invention, the interface may comprise an I2O serial interface, which may be used for camera control, for example. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with VGA, XGA, or HD resolution, for example, and to handle 8/9/16/18/24-bit video data.

The mobile multimedia processor 102 may be connected via an 8/16 bit parallel host interface 129 to the same bus as the baseband processing block 126 uses to access the baseband flash memory 124. The host interface 129 may be operable to provide two channels with independent address and data registers through which a host processor may read and/or write directly to the memory space of the mobile multimedia processor 102. The baseband processing block 126 may comprise suitable logic, circuitry, interfaces, and/or code that may be operable to convert RF signals to baseband and communicate the baseband processed signals to the mobile multimedia processor 102 via the host interface 129, for example. The RF processing block 130 may comprise suitable logic, circuitry, interfaces, and/or code that may be operable to receive signals via the antenna 132 and to communicate RF or IF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported.

The display controller 162 may recognize and communicate a display type to the DMA controller 163. In this regard, the DMA controller 163 may fetch video data in an interlaced or non-interlaced fashion for communication to an interlaced or non-interlaced display coupled to the mobile multimedia processor 102 via the display controller 162.

The subsidiary LCD 136 may comprise suitable logic, circuitry and/or code that may be adapted to communicate with the mobile multimedia processor 102 via a second external memory interface 160, for example. The subsidiary LCD 136 may be used on a clamshell phone where the main LCD 134 may be inside and the subsidiary LCD 136 may be outside, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry, interfaces, and/or code that may be operable to communicate with the mobile multimedia processor 102 via an external memory interface 158, for example. The SDRAM 140 may comprise suitable logic, circuitry and/or code that may be adapted to receive data from the mobile multimedia processor 102 via the external memory interface 158, for example. The external memory I/F 158 may be utilized by the mobile multimedia processor 102 to connect to the SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary external memory interface 160 to connect to memory-mapped LCD and external peripherals, for example. The secondary external memory interface 160 may comprise suitable circuitry, logic, and/or code and may be utilized to connect the mobile multimedia processor 102 to slower devices without compromising the speed of external memory access. The secondary external memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor (MMP) 102 may be adapted to generate 3D graphics images using Open GL and/or OpenVG software, for example. The mobile multimedia processor 102 may be adapted to perform tile mode graphics rendering in two phases comprising a tile binning phase and a tile rendering phase. The tile binning phase may comprise a binning process for determining in which tiles geometric primitives are located. Lists may be generated for each tile which may comprise indices that reference a table of vertex attributes. The indices may be compressed within the tile lists. During the tile rendering phase, the tile lists may be utilized to reference vertex attributes for the primitives located within the tile. The vertex attributes may be brought into local memory on a tile basis. The vertex attributes may be utilized to perform vertex shading and render pixels in a tile. Batches of pixel data may be processed in parallel in the 3D pipeline 103D. The 3D pipeline 103D may generate batches of pixel data by rasterizing geometric primitives from the tile lists, and may perform pixel shading for a plurality of pixel batches in parallel. The shaded batches of pixel data may be written to a buffer in the 3D pipeline 103D, in a specified order. A scoreboarding technique that may utilize wait and unlock signals, may be utilized to control access to the buffer. Once the batches of data are fully shaded, the shaded pixels may be stored in main memory, for example, the RAM 104 or in off chip memory, for example, SDRAM 140.

Figure 2:
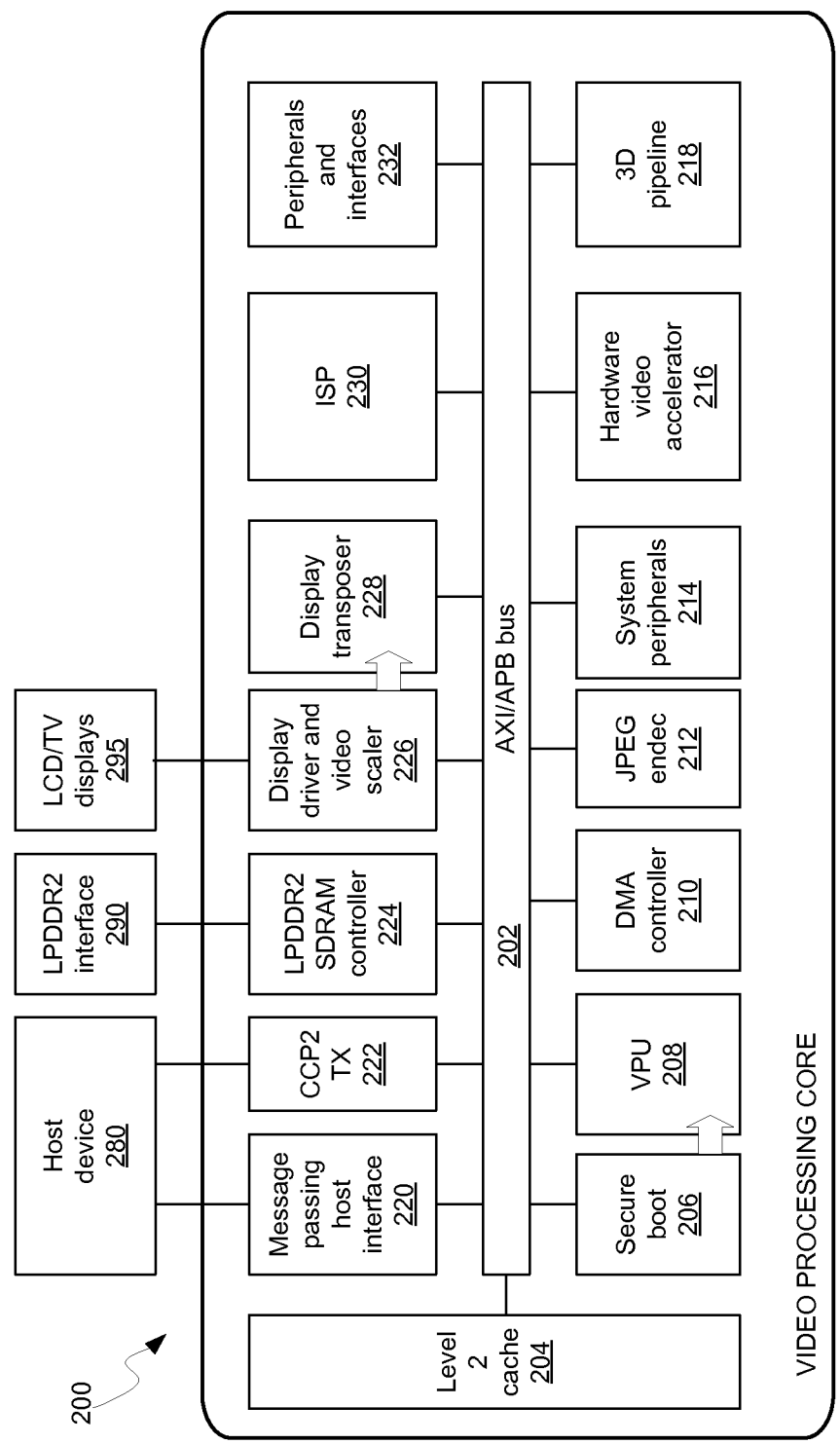
FIG. 2 is a block diagram that illustrates an exemplary video processing core architecture that is operable to process pixels utilizing scoreboarding, in accordance with an embodiment of the invention.

FIG. 2 is a block diagram that illustrates an exemplary video processing core architecture that is operable to process pixels utilizing scoreboarding, in accordance with an embodiment of the invention. Referring to FIG. 2, there is shown a video processing core 200 comprising suitable logic, circuitry, interfaces and/or code that may be configured for high performance video and multimedia processing. The architecture of the video processing core 200 may be configured to provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

The architecture of the video processing core 200 may be configured based on various applications, features and/or capabilities provide by a host device. For example, the video processing core 200 may be configured to support multiple capabilities, comprising image sensor processing, high rate (e.g., 30 frames-per-second) high definition (e.g., 1080p) video encoding and decoding, three-dimensional (3D) graphics, high speed Joint Photographic Experts Group (JPEG) encode and decode, audio codecs, image scaling, and/or liquid crystal display (LCD) and television (TV) outputs, for example.

In one exemplary embodiment of the invention, the video processing core 200 may comprise an Advanced eXtensible Interface/Advanced Peripheral (AXI/APB) bus 202, a level 2 cache 204, a secure boot 206, a Vector Processing Unit (VPU) 208, a direct memory access (DMA) controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 Synchronous Dynamic Random Access Memory (LP-DDR2 SDRAM) controller 224, a display driver and video scaler 226, and a display transposer 228. The video processing core 200 may also comprise an image sensor pipeline (ISP) 230, a hardware video accelerator 216, a 3D pipeline 218, and peripherals and interfaces 232. In other embodiments of the video processing core 200, however, fewer or more components than those described above may be included.

In one embodiment of the invention, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F described above with respect to FIG. 1B.

Coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments of the invention, the host device 280 may correspond to the processor 101*j* described above with respect to FIG. 1A. The LPDDR2 interface 290 may comprise suitable logic, circuitry, and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments of the invention, the LCD/TV displays 295 may correspond to one or more of the TV 101*h* and the external LCD 101*p* described above with respect to FIG. 1A, and the main LCD 134 and the sub LCD 136 described above with respect to FIG. 1B.

The message passing host interface 220 and the CCP2 TX 222 may comprise suitable logic, circuitry, interfaces and/or code that may be operable to allow data and/or instructions to be communicated between the host device 280 and one or more components in the video processing core 200. The data communicated may include image and/or video data, for example.

The LPDDR2 SDRAM controller 224 and the DMA controller 210 may comprise suitable logic, circuitry, and/or code that may be operable to control accessing memory by one or more components and/or processing blocks in the video processing core 200.

The VPU 208 may comprise suitable logic, circuitry, and/or code that may be operable for data processing while maintaining high throughput and low power consumption. The VPU 208 may provide flexibility in the video processing core 200 such that software routines, for example, may be inserted into the processing pipeline. The VPU 208 may comprise dual scalar cores and a vector core, for example. The dual scalar cores may use a Reduced Instruction Set Computer (RISC)-style scalar instruction set and the vector core may use a vector instruction set, for example. Scalar and vector instructions may be executed in parallel.

Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The ISP 230 may comprise suitable logic, circuitry, interfaces and/or code that may be operable to provide hardware accelerated processing of data received from an image sensor (e.g., charge-coupled device (CCD) sensor, complimentary metal-oxide semiconductor (CMOS) sensor). The ISP 230 may comprise multiple sensor processing stages in hardware, including demosaicing, geometric distortion correction, color conversion, denoising, and/or sharpening, for example. The ISP 230 may comprise a programmable pipeline structure. The flexibility of the ISP 230 enables information to be taken from anywhere in the hardware pipeline and processed using software. The resulting software processed data may then be inserted at any location into the ISP 230 for processing.

The hardware video accelerator 216 may comprise suitable logic, circuitry, interfaces and/or code that may enable hardware accelerated processing of video data in any one of a plurality of video formats such as H.264, Windows Media 8/9/10 (VC-1), MPEG-1, MPEG-2, and MPEG-4, for example. For H.264, for example, the hardware video accelerator 216 may encode at full high-definition (HD) 1080p at 30 fps. For MPEG-4, for example, the hardware video acceleration 216 may encode a HD 720p at 30 fps. For H.264, VC-1, MPEG-1, MPEG-2, and MPEG-4, for example, the hardware video accelerator 216 may decode at full HD 1080p at 30 fps or better. The hardware video accelerator 216 may be operable to provide concurrent encoding and decoding for video conferencing and/or to provide concurrent decoding of two video streams for picture-in-picture applications, for example.

The 3D pipeline 218 may comprise suitable logic, circuitry, interfaces and/or code that may be operable to provide 3D rendering operations for use in, for example, graphics applications. The 3D pipeline 218 may support OpenGL-ES 2.0, OpenGL-ES 1.1, and OpenVG 1.1, for example. The 3D pipeline 218 may comprise a multi-core programmable pixel shader, for example. The 3D pipeline 218 may be operable to handle 32M triangles-per-second (16M rendered triangles-per-second), for example. The 3D pipeline 218 may be operable to handle 1 G rendered pixels-per-second with Gouraud shading and one bi-linear filtered texture, for example. The 3D pipeline 218 may support four times (4×) full-screen anti-aliasing at full pixel rate, for example.

The 3D pipeline 218 may be similar and/or substantially the same as the 3D pipeline 103D. The 3D pipeline 218 may comprise parallel processors that may be operable to shade batches of graphics data in parallel. In this regard, the 3D pipeline 218 may utilize a scoreboarding technique for determining which parallel processor or which parallel shader program may have access to memory resources. For example, wait and/or unlock signals may be utilized to communicate when a buffer may be available for storing processed pixel data. Moreover, the scoreboarding technique may enable batches of shaded pixel data to be written to the buffer in a correct order.

The JPEG endec 212 may comprise suitable logic, circuitry, interfaces and/or code that may be operable to provide processing (e.g., encoding, decoding) of images. The encoding and decoding operations need not operate at the same rate. For example, the encoding may operate at 120M pixels-per-second and the decoding may operate at 50M pixels-per-second depending on the image compression.

The display driver and video scaler 226 may comprise suitable logic, circuitry, interfaces and/or code that may be operable to drive the TV and/or LCD displays in the TV/LCD displays 295. Although an LCD display is shown in FIG. 2, the invention is not so limited and may comprise any suitable display type. For example, an LED display and/or a plasma display may be utilized. The display driver and video scaler 226 may output to the TV and LCD displays concurrently and in real time, for example. Moreover, the display driver and video scaler 226 may comprise suitable logic, circuitry, interfaces and/or code that may be operable to scale, transform, and/or compose multiple images. The display driver and video scaler 226 may support displays of up to full HD 1080p at 60 fps.

The display transposer 228 may comprise suitable logic, circuitry, interfaces and/or code that may be operable for transposing output frames from the display driver and video scaler 226. The display transposer 228 may be operable to convert video to 3D texture format and/or to write back to memory to allow processed images to be stored and saved.

The secure boot 206 may comprise suitable logic, circuitry, interfaces and/or code that may be operable to provide security and Digital Rights Management (DRM) support. The secure boot 206 may comprise a boot Read Only Memory (ROM)) that may be used to provide secure root of trust. The secure boot 206 may comprise a secure random or pseudo-random number generator and/or secure (One-Time Password) OTP key or other secure key storage.

The AXI/APB bus 202 may comprise suitable logic, circuitry, and/or interface that may be operable to provide data and/or signal transfer between various components of the video processing core 200. In the example shown in FIG. 2, the AXI/APB bus 202 may be operable to provide communication between one or more of the components the video processing core 200.

The AXI/APB bus 202 may comprise one or more buses. For example, the AXI/APB bus 202 may comprise one or more AXI-based buses and/or one or more APB-based buses. The AXI-based buses may be operable for cached and/or uncached transfer, and/or for fast peripheral transfer. The APB-based buses may be operable for slow peripheral transfer, for example. The transfer associated with the AXI/APB bus 202 may be of data and/or instructions, for example. The AXI/APB bus 202 may provide a high performance system interconnect that allows the VPU 208 and other components of the video processing core 200 to communicate efficiently with each other and with external memory.

The level 2 cache 204 may comprise suitable logic, circuitry, interfaces and/or code that may be operable to provide caching operations in the video processing core 200. The level 2 cache 204 may be operable to support caching operations for one or more of the components of the video processing core 200. The level 2 cache 204 may complement level 1 cache and/or local memories in any one of the components of the video processing core 200. For example, when the VPU 208 comprises its own level 1 cache, the level 2 cache 204 may be used as complement. The level 2 cache 204 may comprise one or more blocks of memory. In one embodiment, the level 2 cache 204 may be a 128 kilobyte four-way set associate cache comprising four blocks of memory (e.g., Static Random Access Memory (SRAM)) of 32 kilobytes each.

The system peripherals 214 may comprise suitable logic, circuitry, interfaces and/or code that may be operable to support applications such as, for example, audio, image, and/or video applications. In one embodiment, the system peripherals 214 may be operable to generate a random or pseudo-random number, for example. The capabilities and/or operations provided by the peripherals and interfaces 232 may be device or application specific.

In operation, the video processing core 200 may be operable to carry out a plurality of multimedia tasks simultaneously without degrading individual function performance. Furthermore, with regard to graphics rendering, the 3D pipeline 218 may render pixel data in parallel. Various aspects of the invention may comprise utilizing a scoreboard to coordinate writing of shaded pixels to buffers within the 3D pipeline 218. Wait and unlock signals may enable batches of pixel data that are processed in parallel to be written to buffer memory in a specified order if necessary. Once the batches of data are fully shaded, the shaded pixels may be stored, for example, in the layer 2 cache 204 via the AXI/APB bus 202.

In an exemplary embodiment of the invention, the video processing core 200 may be operable to implement movie playback operations. In this regard, the video processing core 200 may be operable to add 3D effects to video output, for example, to map video onto 3D surfaces or to mix 3D animation with the video. The 3D graphics may be rendered by the 3D pipeline 218 on a tile basis utilizing scoreboarding.

In another exemplary embodiment of the invention, the video processing core 200 may be utilized in a gaming device. In this regard, full 3D functionality may be utilized. The VPU 208 may execute a game engine and may supply polygons to the 3D pipeline, for example, enabling high quality self-hosted games. During parallel pixel rendering of the polygons, the 3D pipeline 218 may utilize scoreboarding to control writing batches of pixels to a buffer, in a specified order if necessary.

In another embodiment of the invention, the video processing core 200 may be utilized for stills capture. In this regard, the ISP 230 and/or the JPEG endec 212 may be utilized to capture and encode a still image. For stills viewing and/or editing, the JPEG endec 212 may be utilized to decode the stills data and the video scaler may be utilized for display formatting. Moreover, the 3D pipeline may utilize scoreboarding to render 3D effects, for example, for warping an image or for page turning transitions in a slide show, for example.

Figure 3:
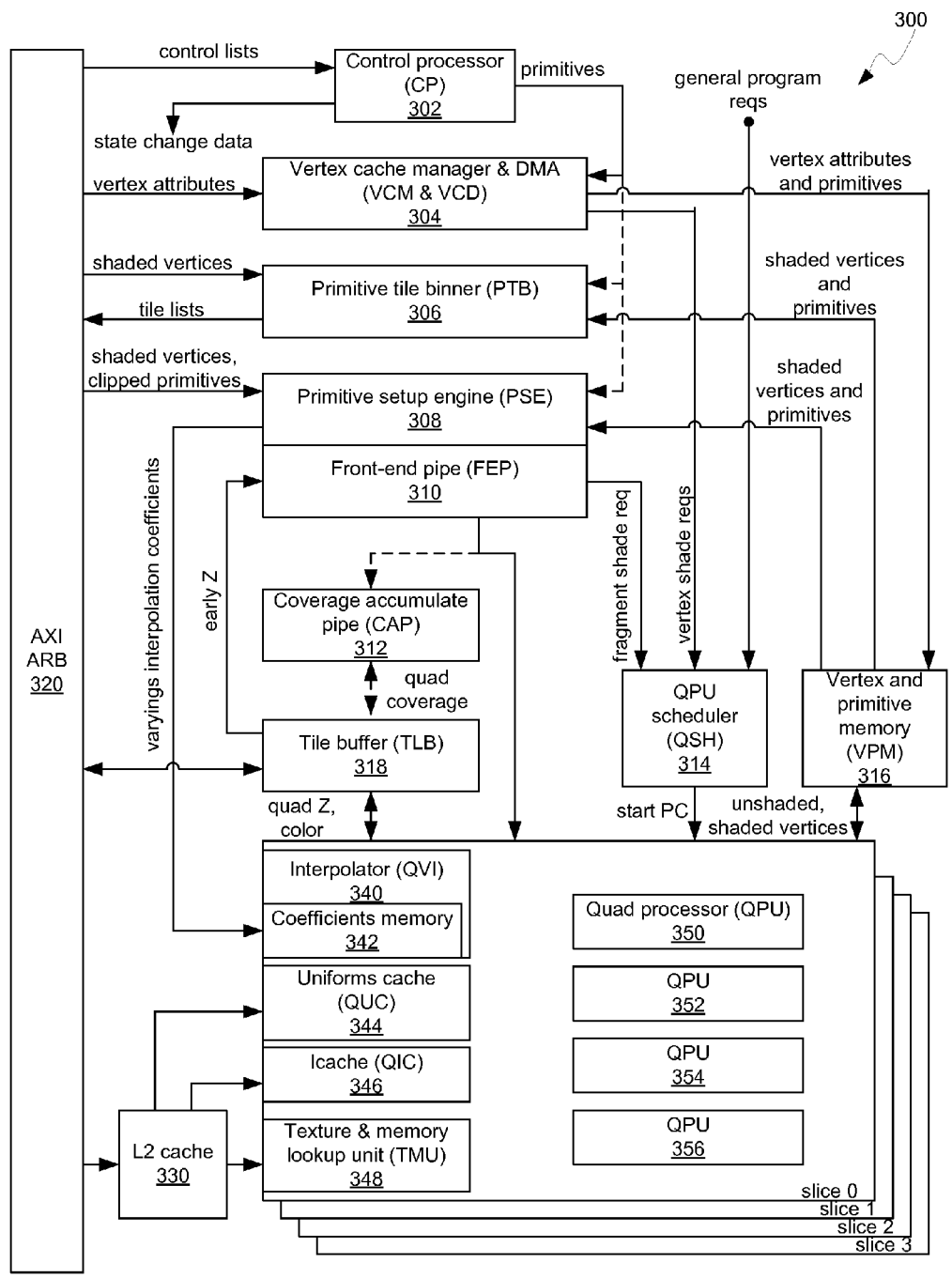
FIG. 3 is a block diagram that illustrates an exemplary 3D pipeline architecture that is operable to process pixels utilizing scoreboarding, in accordance with an embodiment of the invention.

FIG. 3 is a block diagram that illustrates an exemplary 3D pipeline architecture that is operable to process pixels utilizing scoreboarding, in accordance with an embodiment of the invention. Referring to FIG. 3, there is shown, a 3D pipeline 300 that may comprise a control processor 302, a vertex cache manager and DMA 304, a primitive tile binner 306, a primitive setup engine 308, a front-end pipe 310, a coverage accumulate pipe 312, a QPU scheduler 314, a vertex and primitive memory 316, a tile buffer 318, a bus arbiter 320, a cache 330, an interpolator 340, a coefficients memory 342, a uniforms cache 344, an instruction cache 346, a texture and memory lookup unit 348 and a plurality of quad processor units 350, 352, 354 and 356.

The 3D pipeline 300 may be similar and/or substantially the same as the 3D pipeline 218 described with respect to FIG. 2 and/or may be implemented within the mobile multimedia system 105, for example. The 3D pipeline may comprise a scalable architecture and may comprise a plurality of floating-point shading processors, for example, the quad processor units (QPU) 350, 352, 354 and 356. In various embodiments of the invention, the 3D pipeline 300 may be operable to support OpenGL-ES and/or OpenVG applications. Moreover, the 3D pipeline 300 may be utilized in a wide variety of SoC devices, for example, a gaming device. The 3D pipeline 300 may comprise suitable logic, circuitry, interfaces and/or code that may be operable to perform tile-based graphics rendering in two phases. For example, a frame or screen worth of pixels may be divided into a plurality of areas referred to as tiles. Each tile may be rendered in two phases. For example, the 3D pipeline may perform a tile binning phase which may comprise coordinate shading and a tile rendering phase which may be referred to as a pixel rendering phase. Rendering pixels by tiles rather than by frames may enable improved memory bandwidth and/or improved processing performance.

The 3D pipeline 300 may be operable read batches of primitive data and/or corresponding control data from system memory. In various embodiments of the invention, the 3D pipeline 300 may be operable to parse the batches of data and may generate control lists that may be utilized for data flow and/or for control flow when rendering the data in each tile. The control lists may comprise primitive data and/or pointers to primitive data, for example, color, texture, position and/or view information. In addition, the control lists may comprise control data such as register settings and/or commands for binning and/or rendering the primitive data. In addition, the 3D pipeline 300 may utilize a scoreboard system to coordinate writing out of color shaded pixel fragments by parallel quad processors.

The quad processors (QPU) 350, 352, 354 and 356 may comprise suitable logic, circuitry, interfaces and/or code that may be operable to perform tile based vertex and/or fragment shading. The QPUs 350, 352, 354 and/or 356 may comprise multiple instances of a special purpose floating-point shader processor. In various embodiments of the invention, each of QPUs 350, 352, 354 and/or 356 may comprise a 16-way single instruction multiple data (SIMD) processor that may be operable to process streams of quads of pixels, however, the invention is not limited in this regard. The QPUs may be organized into groups of 4, for example, that may be referred to as slices. The QPUs 350, 352, 354 and/or 356 may share various common resources. For example, the slices may share the instruction cache (QIC) 346, one or two texture and memory lookup units (TMU) 348, the uniforms cache 344, the coefficients memory 342 and/or the interpolator (QVI) 340. The QPUs 350, 352, 354 and 356 may be closely coupled to 3D hardware for fragment shading and may utilize signaling instructions and dedicated internal registers. The QPUs 350, 352, 354 and 356 may perform vertex shading, in parallel, on successive batches of vertices. The QPUs may also perform fragment shading, in parallel, on successive batches of pixel fragments. For example, the QPUs 350, 352, 354 and/or 356 may utilize wait and/or unlock signaling to coordinate writing of color shaded pixel fragments to the tile buffer (TLB) 318. The QPUs 350, 352, 354 and 356 may also support a plurality of hardware threads with cooperative thread switching that may hide texture lookup latency during 3D fragment shading.

The QPUs 350, 352, 354 and/or 356 may be operable to perform various aspects of interpolating vertices in modified primitives, for example, in clipped primitives. The interpolated vertices may be referred to as varyings. In this regard, blend functions and/or various aspects of the varyings interpolation may be performed in software.

The vertex cache manager and vertex direct memory access (VCM and VCD) 304 may comprise suitable logic, circuitry, interfaces and/or code that may be operable to collect batches of vertex attributes and may place them into the vertex and primitive memory (VPM) 316. Each batch of vertices may be shaded by one of the QPUs 350, 352, 354 and/or 356 and the results may be stored back into the VPM 316.

The primitive setup engine (PSE) 308 may comprise suitable logic, circuitry, interfaces and/or code that may be operable to fetch shaded vertex data from the VPM 316. Moreover, the PSE 308 may be operable to calculate setup data for rasterizing primitives and coefficients of various equations for interpolating the varyings. In this regard, rasterizer setup parameters and Z and W interpolation coefficients may be fed to the front end pipeline (FEP) 310. The varyings interpolation coefficients may be stored directly to a memory within each of the QPUs 350, 352, 354 and/or 356 slices for just-in-time interpolation.

The front end pipeline (FEP) 310 may comprise suitable logic, circuitry, interfaces and/or code that may be operable to perform rasterizer, Z interpolation, Early-Z test, W interpolation and W reciprocal functions. Groups of pixels output by the FEP 310 may be stored into registers mapped into QPUs which are scheduled to carry out fragment shading for that group of pixels.

There is nominally one texture and memory lookup unit (TMU) per slice, but texturing performance may be scaled by adding TMUs. Due to the use of multiple slices, a same texture may appear in more than one TMU. To avoid memory bandwidth and cache memory wastage with common textures, there is a L2 texture cache (TL2), and each TMU may have only a small internal cache.

Each QPU 350, 352, 354 and/or 356 may comprise one or more of the texture and memory look up units (TMU) 348 and may share the TL2 cache 330. The TMUs 348 may comprise suitable logic, circuitry, interfaces and/or code that may be operable to perform general purpose data lookups from memory and/or for filtered texture lookups. Alternatively, the VCD 304 may be operable perform direct memory access of data going into or out of the VPM 316 where it may be accessed by the QPUs 350, 352, 354 and/or 356.

The coverage accumulation pipeline (CAP) 312 may comprise suitable logic, circuitry, interfaces and/or code that may be operable to perform OpenVG coverage rendering, for example. In this regard, the QPUs 350, 352, 354 and/or 356 may be bypassed.

The QPUs 350, 352, 354 and/or 356 and/or the CAP 312 may output pixel data to the tile buffer (TLB) 318. In various embodiments of the invention, the TLB 318 may be configured to handle 64×64 samples and/or may support 32×32 pixel tiles. In other embodiments of the invention, TLB 318 may handle 64×64 pixel tiles in non-multi-sample and/or OpenVG 16× coverage modes. The TLB may also be configured to handle 64×32 samples with 64-bit floating-point color for HDR rendering, for example. The TLB 318 may be operable to write decimated color data to a main memory frame buffer when rendering of a tile is complete. The TLB 318 may store and/or reload the tile data to and/or from memory using data compression.

In operation, the 3D pipeline 300 may be operable to receive primitive and/or vertex data and may output rendered pixels. The control processor (CP) 302 may be operable to fetch, parse and/or interpret control lists. The CP 302 may be operable to feed the 3D pipeline 300 with primitive and/or vertex data and/or control data.

The 3D pipeline 300 may perform tile-based pixel rendering in a plurality of phases, for example, a tile binning phase and a tile rendering phase. During the tile binning phase, only a vertex coordinate transform part of the vertex shading may be performed. The primitive tile binner (PTB) 306 may fetch transformed vertex coordinates and/or primitives from the VPM 316 and may determine which tiles, if any, a primitive may overlap. In this regard, the PTB 306 may build a list in memory for each tile. A tile list may comprise information regarding primitives which overlap the tile and/or may comprise references to any control data and/or state change that may apply. For example, a tile list may comprise indices that may point to stored vertex attributes for vertices of the primitives overlapping the tile. In various embodiments of the invention, the indices may be compressed.

During the tile rendering phase, pixels may be rendered in screen space with color, light and/or texture, for example. The vertex cache manager and vertex cache DMA (VCM and VCD) 304 may be operable to read indices and may be operable to retrieve vertex data pointed to by the indices in an array of vertices. The VCM and VCD 304 may store the primitive and/or vertex data in the vertex and primitive memory (VPM) 316. When primitive and/or vertex data is stored within the VPM 316, coordinate shading and/or full vertex shading may be launched.

Tile binning and tile rendering may be handled in a plurality of threads which may be referred to as pipelines. For example, two processing threads may be utilized to perform the tile binning and/or the tile rendering. In various embodiments of the invention, tile rendering may be performed on one set of data concurrently with tile binning for another set of data. For example, when a set of data has been processed by a tile binning pipeline, that set of data may be processed by a tile rendering pipeline. Concurrent with the tile rendering, another set of data may be processed by the tile binning pipeline.

With regard to coordinate shading during tile binning, when a batch of data is loaded in the VPM 316, the quad processor scheduler (QPU scheduler) 314 may schedule one or more QPUs to process the data. Vertices represented in the modeling space may be read from the VPM 316 and sent in order they were read to the one or more quad processors (QPU) 350, 352, 354 and/or 356, for example. The QPUs 350, 352, 354 and/or 356 may transform the modeling space coordinates to screen space coordinates and may store the results back to the VPM 316. Indices may be passed to the primitive tile binner (PTB) 306. The PTB 306 may fetch the shaded screen space coordinate data from the VPM 316 and may determine in which tile a primitive, for example, a triangle, may be located. The PTB 306 may store indices for the primitive into an appropriate tile list. Moreover, control-data and/or pointers to control-data may be stored in appropriate tile lists.

With regard to the tile rendering phase, the PSE may determine equations for triangle edges that may be utilized for rasterization and/or may determine coefficients for interpolating shading values, for example. Output from the PSE 308 may be sent to the front end pipeline (FEP) 310. The FEP 310 may determine which pixel fragments may be utilized for which triangles in the tile. Output from the FEP 310, for example, the pixel fragment information and/or coefficients may be sent to one or more QPUs, for example, the QPUs 350, 352, 354 and/or 356 for pixel rendering and/or varyings interpolation, for example.

The QPU scheduler 314 may keep track of which QPU and/or which slice is available to perform vertex and/or fragment shading. The QPU scheduler 314 may schedule processing by the QPUs 350, 352, 354 and/or 356, for example, fragment shading. The QPU scheduler 314 may communicate various batches of pixel fragment and/or vertex data to each of the QPUs 350, 352, 354 and/or 356 in a certain order. The different QPUs 350, 352, 354 and/or 356 may process the various batches of fragment and/or vertex data utilizing different caching schemes, different accessing activity and/or different length programs. An order in which the QPUs 350, 352, 354 and/or 356 completes processing the various batches of fragment and/or vertex data may be different than the order in which the various batches data are received by the QPUs. The QPUs may output fragment color shading results to the tile buffer (TLB) 318. For example, during the tile rendering phase, the TLB 318 may be utilized to buffer rendered pixels. The QPUs 350, 352, 354 and/or 356 may share the TLB 318. A scoreboard system may be utilized to control the order in which a plurality of the QPUs 350, 352, 354 and/or 356 write fragment shading results, for example, to the TLB 318. In various embodiments of the invention, pixel fragment data that does not overlap other pixel fragment data that is currently being shaded, may be written to the TLB 318 in any order. Notwithstanding, utilizing the scoreboarding system, color values for pixel fragment data that overlaps in screen space with other pixel fragment data that is currently being shaded, may be written to the TLB 318 in the same order that the pixel fragment data was communicated by the QPU scheduler 314 to the QPUs 350, 352, 354 and/or 356. Each of the QPUs 350, 352, 354 and/or 356 may execute fragment shading instructions over a plurality of cycles. For pixel fragment data that overlaps other pixel fragment data, after executing the fragment shading instructions, each of the QPUs 350, 352, 354 and/or 356 may wait until fragment shading results are written to the TLB 318 by any QPUs that have overlapping fragments and were scheduled earlier by the QPU scheduler 314. The QPUs 350, 352, 354 and/or 356 may signal when they have completed writing a batch of pixel fragment color values to the TLB 318, for example, utilizing an unlock signal. In this manner, the QPUs 350, 352, 354 and/or 356 may perform fragment shading in parallel.

Once a tile has been rendered, contents of a color buffer in the TLB 318 may be written to main memory, for example. When pixel data for each tile has been written out of the TLB 318, the TLB 318 may be reset or cleared in preparation for rendering the next tile.

Figure 4A:
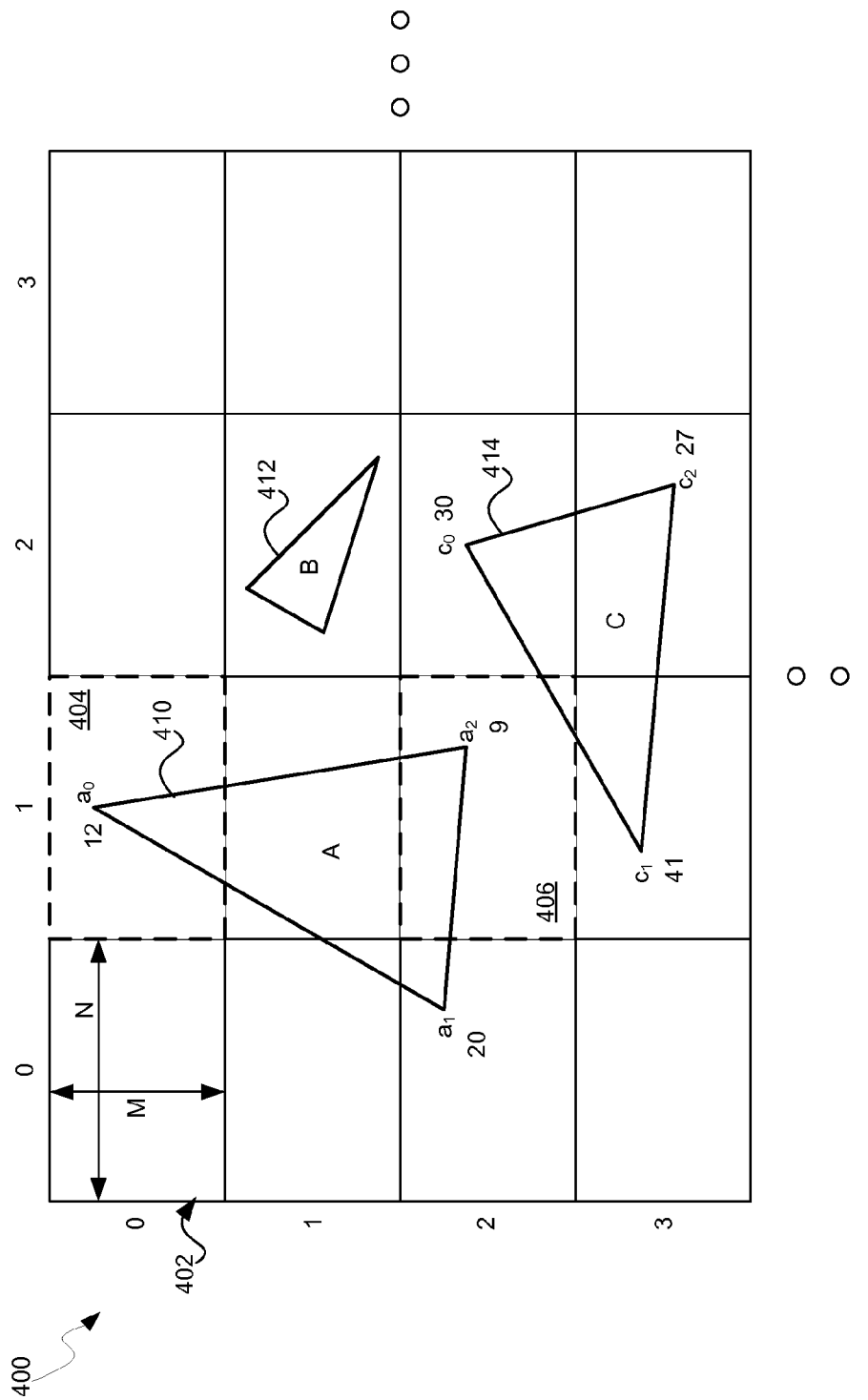
FIG. 4A is a block diagram that illustrates exemplary graphics primitives transformed into a tiled view-space, in accordance with an embodiment of the invention.

FIG. 4A is a block diagram that illustrates exemplary graphics primitives transformed into a tiled view-space, in accordance with an embodiment of the invention. Referring to FIG. 4A, there is shown, a tiled view-space frame 400, a plurality of tiles 402, a tile 404, a tile 406 and a plurality of triangles comprising a triangle a 410, a triangle B 412, and a triangle C 414. The triangle A 410, the triangle B 412, and/or the triangle C 414 may be referred to as the triangles 410, 412 and/or 414.

The tiled view-space frame 400 may be divided into a plurality of tiles 402. The tiles may be identified according to their position, for example, the tile 404 may be identified as tile (1, 0) and the tile 406 may be identified as the tile (1, 2). In an exemplary embodiment of the invention, each of the plurality of tiles 402 may comprise a 32×32 block of pixel information, although the invention is not limited in this regard. Graphics primitives may be positioned within in the tiled view-space frame 400, for example, the triangles 410, 412 and/or 414 may be placed within the tiled view-space frame 400. Other types of primitives may be utilized, for example, lines, points and/or RHTs. The graphics primitives, for example, the triangles 410, 412 and/or 414 may overlap one or more of the tiles 402. The graphics primitives may be represented in the tiled view-space 400 according to view-space coordinates of their vertices. The graphics primitives and/or their vertices may define one or more of an image, an object and/or a surface, for example. In this regard, the view-space coordinates may indicate a rendered object's position on a video screen.

In operation, graphics primitives, for example, the triangles 410, 412 and/or 414, may be positioned in the tiled view-space frame 400 during the tile binning phase and/or during the tile rendering phase of pixel rendering. Prior to representation in the tiled view-space frame 400, the graphics primitives, for example, the triangles 410, 412 and/or 414, may be generated and/or represented in a model space by graphics software. For example, software based on OpenGL and/or variations and/or extensions thereof such as OpenGL-ES may generate the graphics primitives in modeling space. A table of vertices generated by the OpenGL software may comprise the vertex information and/or vertex attributes of the primitives. The OpenGL table of vertices may be stored in main memory. In addition, a list of uncompressed indices that reference vertices stored within the OpenGL generated table of vertices may also be stored in main memory, for example, within the mobile multimedia system 105. In this regard, one uncompressed index that may reference one vertex may comprise 32 bits. The model space primitives may be arbitrarily positioned within the modeling space. The 3D pipeline 300 may read vertex information for the graphics primitives represented in modeling space and may apply various transforms that may place the primitives, for example, the triangles 410, 412 and/or 414 at certain coordinates within the tiled view-space frame 400. In this regard, a transformation may place the primitives at the certain coordinates within the tiled view-space frame 400 and another transformation may rotate the primitives according to a field of view. Coordinates for vertices of the graphics primitives in view-space may be determined by the 3D pipeline 300. For example, one or more QPUs 350, 352, 354 and/or 356 may determine the coordinates for the triangles 410, 412 and/or 414 within the tiled view-space frame 400. The transformations may be implemented by matrix multiplication of modeling space coordinates and position and view information received from the OpenGL graphics software, for example.

FIG. 4B is a block diagram that illustrates exemplary vertex information that may be utilized during a tile binning phase and/or during a tile rendering phase, in accordance with an embodiment of the invention. Referring to FIG. 4B, there is shown, a table of vertices 450 and a plurality of indexed vertex records 452, 454, 456, 458, 460 and 462.

The table of vertices 450 may comprise vertex information for the triangles 410, 412 and/or 414. The indexed vertex records 452, 454, 456, 458, 460 and 462 may comprise information utilized for tile mode binning and/or for tile mode rendering of the triangles 410, 412 and/or 414. The vertex information may also be utilized for interpolating vertices, for example, vertices interpolated for a clipped primitive as described with respect to FIG. 5A, FIG. 5B and FIG. 5C.

In an exemplary embodiment of the invention, the indexed vertex records 452, 454 and 456 may be associated with the indices 9, 12 and 20 and may each comprise information regarding a vertex of the triangle A 410. The indices 9, 12 and 20 may be encoded and/or compressed in each tile list that comprises the triangle A 410 during the tile binning phase and may be utilized to retrieve vertex information during the tile rendering phase. The vertex information may be referred to as vertex attributes. Information stored within each of the indexed vertex records 452, 454, 456, 458, 460 and 462 may comprise modeling space coordinates for a vertex and/or information that may enable transformation of the vertex to a location and/or a field of view within a view-space, for example, within the tiled view-space frame 400. Moreover, information or attributes stored within the indexed vertex records 452, 454, 456, 458, 460 and 462 may comprise lighting, texture, color and/or other information that may be utilized for full vertex shading.

The table of vertices 450 may be stored in main memory and the indexed vertex information needed for rendering of a particular tile may be read into local memory based on the compressed tile list during rendering of the tile. Once pixels for a tile are rendered, the pixel data may be stored in main memory.

In operation, control lists may be utilized to render the triangles 410, 412 and/or 414. The rendering may comprise a tile binning phase and a tile rendering phase. The triangles 410, 412 and/or 414 may be rendered based on information describing their vertices and/or any interpolated vertices. In this regard, steps performed during the tile binning phase may comprise a subset of the steps performed during the rendering phase. For example, during the tile binning phase, primitives may be transformed into view-space and view-space coordinates for vertices of the primitives may be determined. As such, the binning phase may be referred to as a coordinate shading phase. Primitives that overlap a tile may be identified. For example, the tile (1, 0) 404 may be overlapped by the triangle A 410. The tile (2, 1) 406 may be overlapped by the triangle A 410 and the triangle C 414. Vertex information and/or vertex attributes may be stored in indexed records within the table of vertices 450. For each tile 402, a tile list may be generated during the tile binning phase that may comprise compressed indices that may be utilized to index vertices within the table of vertices 450. For example, a tile list for the tile (1, 0) 404 may comprise compressed indices that point directly or indirectly to records for vertices of the triangle A 410. A tile list for the tile (1, 2) 404 may comprise compressed indices that point directly or indirectly to records for the vertices of the triangle C 414.

FIG. 4C is a block diagram that illustrates exemplary primitive and/or vertex index information that may be encoded during a tile binning phase, in accordance with an embodiment of the invention. Referring to the FIG. 4C, there is shown a tile list 430 comprising tile records 432 and 434.

The tile list 430 may comprise a control list or control sub-list that may be generated during a tile binning phase of tile mode graphics rendering. The tile list 430 may be generated based on coordinates of the triangles 410, 412 and/or 414 in the tiled view-space frame 400. For example, the vertex cache manager and DMA (VCM & VCD) 304 may collect vertex attributes and place them into the vertex and primitive memory (VPM) 316. The primitive tile binner (PTB) 306 may fetch transformed vertex coordinates and/or primitives from the vertex and primitive memory (VPM) 316 and may generate the tile list 430 that may comprise compressed indices. In this regard, each tile within the plurality of tiles 402 may be associated with a record in the tile list 430, for example, the records 432 and 434. In an exemplary embodiment of the invention, the record 432 may comprise an identity of the tile (1, 0) 404 and/or an identity of the triangle A 410. In addition, the record 432 may comprise one or more compressed indices that may point directly or indirectly to one or more records comprising vertex information for the triangle A 410, for example, the indices 12, 20, 9. Similarly, the record 434 may comprise an identity of the tile (1, 2) 406 and/or an identity of the triangle A 410 and the triangle C 414. In addition, the record 434 may comprise compressed indices that reference one or more records in the table of vertices 450 which comprises vertex information for the triangle A 410 and the triangle C 414, for example, one or more of the compressed indices 12, 20, 9 and the indices 30, 27 and 41.

In operation, information in the tile list 430 may be utilized for controlling tile mode graphics rendering by the 3D pipeline 300. For example, vertices may be rendered on a tile basis based on contents of the tile lists. In this regard, during the binning phase, indices corresponding to records of the table of vertices 450 may be compressed and/or stored in the tile list 430. Also, other information within the tile list 430 may be compressed. For example, the compressed indices stored in the tile list 430 may be differentially encoded by indicating a difference in adjacent or nearby index values rather than storing absolute index values. Absolute index values may comprise a large number of bits, for example, 32 bits and differential encoding of the indices may significantly reduce memory bandwidth for storing tile lists as well as improving cache access time. Moreover, in instances when one or more of the vertices are shared by a plurality of joined primitives, for example, two triangles may share two vertices; shared indices may not be repeated in a tile list. Once an index is listed for one vertex and/or for one primitive, indices listed for another joined primitive may only comprise indices for vertices that have not been previously encoded in the tile list. Additional information regarding how the primitives are joined may also be encoded in the tile list. For example, triangles may be joined in a fan or strip pattern. Furthermore, a sequence of fans and/or strips may be joined. In various embodiments of the invention, a compressed sequence of indices may be represented in the tile list 430 by one number. Exemplary joined primitives are shown in FIG. 5A, FIG. 5B and FIG. 5C which comprise a triangle strip and a triangle fan. In contrast, OpenGL software output may comprise a 32 bit index for each vertex in each joined primitive.

In various embodiments of the invention, the view-space coordinates that are determined during the binning phase may be discarded once the tile lists are generated. The view-space coordinates may be generated again during the rendering phase. In this manner, memory may be conserved.

Compressed tile lists may follow inline with a control list or may comprise a linked sub-list, for example. The tile lists may be utilized for controlling the 3D pipeline 300. Each primitive within the tile list may be encoded in a variable number of bytes, for example. The compressed tile lists may be terminated with an escape code. The compressed lists may also comprise embedded branch records. The embedded branches may enable the list to be composed of multiple chained memory blocks without wasting memory escaping from and restarting the compressed list.

FIG. 5A is a block diagram that illustrates an exemplary primitive that extends beyond the borders of a viewport and/or of a tile, in accordance with an embodiment of the invention. Referring to FIG. 5A, there is shown a view-space frame 502A, a triangle 504 and a clipped triangle 510A.

The view-space frame 502 may be similar to the tiled view-space frame 400.

In operation, during a binning phase of graphics rendering, the coordinates for vertices of the triangle 510 may be determined. In addition, it may be determined that portions of the triangle 510 may extend beyond the area of the view-space frame 502A. In this instance, the portions of the triangle 510 that extend beyond the border of the view-space frame 502A may be clipped. New vertices that define the clipped triangle 510 may be determined.

FIG. 5B is a block diagram that illustrates an exemplary clipped primitive that is represented as a plurality of fanned triangles that comprise shared vertices, in accordance with an embodiment of the invention. Referring to FIG. 5B, there is shown the view-space frame 502 and a fan of triangles 510B.

The clipped triangle 510A may be divided into a plurality of new triangles that may be stored in a record. The plurality of new triangles may be arranged in a fan pattern, for example, as in the fan of triangles 510B. In this regard, the plurality of new triangles may be joined. For example, the plurality of new triangles may comprise shared or overlapping vertices, some or all of which may be new vertices. In this regard, a plurality of triangles radiate from a single vertex in the fan of triangles 510A. Rather than binning the entire triangle 504, the plurality of new triangles may be binned. For example, it may be determined which tiles are overlapped by the plurality of new triangles. Tile lists may be populated with information regarding the new triangles. For example, vertex coordinates for the new triangles may be directly stored within relevant tile lists along with barycentric coordinates for each new vertex. The barycentric coordinates for a new vertex may be utilized to determine shading properties of the new vertex during full vertex shading. For example, the barycentric coordinates of a new vertex may be utilized as weights that indicate its location relative to each of the original vertices of the triangle 504. During full vertex shading, the barycentric coordinates may be utilized to interpolate rendering properties of the new vertex from properties of the original vertices of the triangle 504. The barycentric coordinates may comprise a vector of elements that may sum to one.

In operation, a binning phase of the triangle 504 that may extend to extreme locations and/or extend beyond the boundaries of the view-space frame 502, the triangle 504 may be clipped. The remaining portion of the clipped triangle may be divided into a plurality of new triangles comprising a fan pattern, for example, the fan of triangles 510B. Coordinates the new triangle's vertices may be determined as well as their barycentric coordinates and/or barycentric weights. The coordinates of the new vertices as well as the barycentric coordinates and/or barycentric weights may be stored in the appropriate tile lists. In order to save space, since the barycentric coordinates and/or weights sum to one, only two of the coordinates may be stored. Moreover, shared vertices may be stored only once rather than repeatedly stored for each new triangle.

In various embodiments of the invention, memory may be conserved by storing clipped primitive information in a separate memory location and pointing to it from the tile list. This may conserve significant memory bandwidth in instances when the clipped primitive overlaps a plurality of tiles.

FIG. 5C is a block diagram that illustrates an exemplary clipped primitive that is represented as a strip of triangles comprising overlapping vertices, in accordance with an embodiment of the invention. Referring to FIG. 5C, there is shown the view-space frame 502 and a strip of triangles 510C.

The strip of triangles 510C comprises a plurality of joined triangles in a strip pattern rather than a fan pattern that radiates from a single shared vertex. The strip of triangles may be generated and binned the same or a similar manner as the fan of triangles 510B. Moreover, vertex coordinates and barycentric coordinates may be determined and stored in the same manner and/or in a similar manner for the strip of triangles 510C as for the fan of triangles 510B.

Figure 6A:
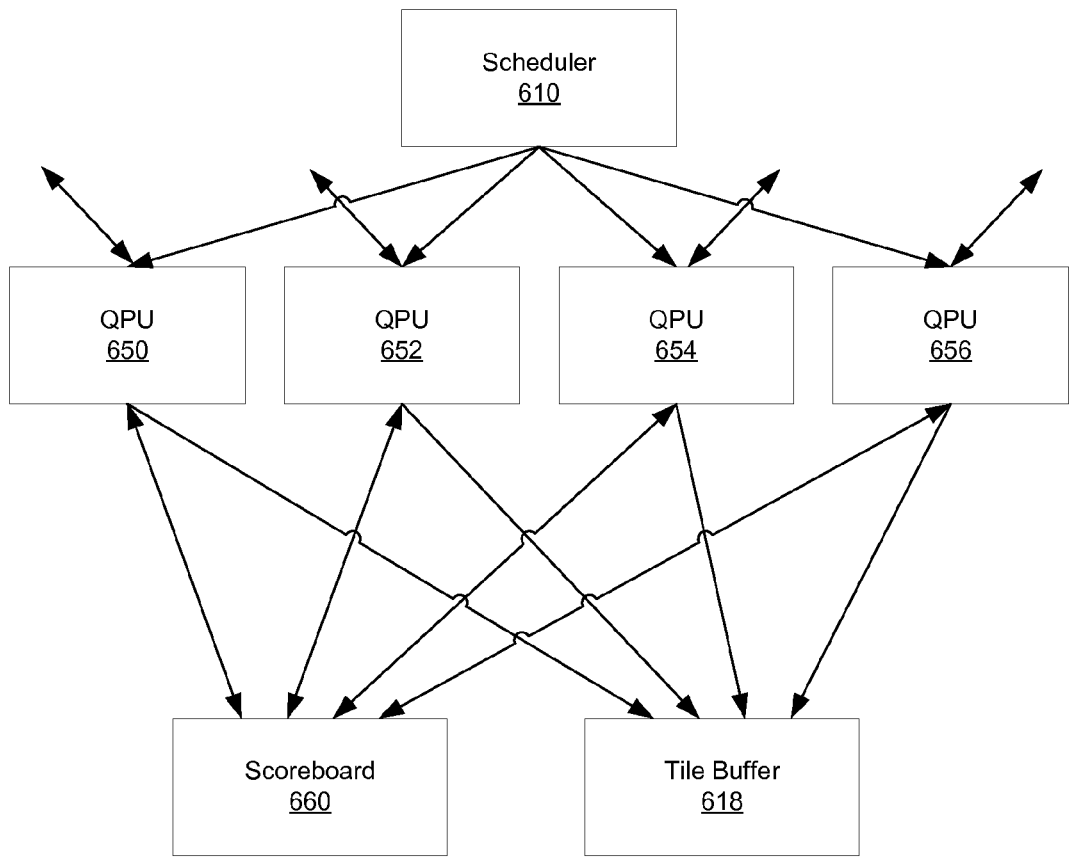
FIG. 6A is a block diagram that illustrates exemplary 3D pipeline modules that are operable to process pixels utilizing scoreboarding, in accordance with an embodiment of the invention.

FIG. 6A is a block diagram that illustrates exemplary 3D pipeline modules that are operable to process pixels utilizing scoreboarding, in accordance with an embodiment of the invention. Referring to FIG. 6A, there is shown, a scheduler 610, a plurality of quad processing units (QPU) 650, 652, 654 and 656, a scoreboard 660 and a tile buffer (TLB) 618.

The scheduler 610 and the TLB 618 may be similar and/or substantially the same as the scheduler 310 and the TLB 318 described with respect to FIG. 3. Furthermore, the QPUs 650, 652, 654 and 656 may be similar and/or substantially the same as the QPUs 350, 352, 354 and 356.

The scoreboard 660 may comprise suitable logic, circuitry, interfaces and/or code that may be operable to control various aspects of writing data, for example, rendered pixel data, to the tile buffer (TLB) 618 from one or more of the QPUs 650, 652, 654 and 656. The scoreboard 660 may enforce writing the data to the TLB 618 in the correct order.

In operation, the QPUs 650, 652, 654 and 656 may be operable to perform fragment shading and may write results to the TLB 618. For example, the QPUs 650, 652, 654 and 656 may perform fragment color shading and may write color values to the TLB 618. The scoreboard module 660 may enable the QPUs 650, 652, 654 and 656 to write results to the TLB 618 in a correct rendering order when necessary. When a batch of data comprises pixel fragments that overlap fragments in one or more other batches of earlier data that is still being shaded, the batch of data may be written to the TLB 618 from a plurality of the QPUs 650, 652, 654 and/or 656 in a specified order. For example, the QPUs 650, 652, 654 and/or 656 may write batches of color shaded pixel fragment data to the TLB in the same order that corresponding batches of pixel fragment data was written to the QPUs 650, 652, 654 and/or 656 from by the scheduler 610. In various exemplary embodiments of the invention, a fragment shader program in one of the QPUs 650, 652, 654 and/or 656 may perform a "scoreboard wait" operation prior to accessing the TLB 618. The "scoreboard wait" operation may suspend access to the TLB 618 by the given QPU, as necessary, until all preceding accesses to the same pixel fragments from other shaders have completed. The shader program may signal "unlock scoreboard" after all accesses to the TLB 618 are complete for a batch of data. The "unlock scoreboard" signal may enable subsequent writes to the TLB 618 by other shader programs and/or other QPUs 650, 652, 654 and/or 656, which are suspended by a "scoreboard wait" because they have pixel fragments that overlap the fragments in the current shader program. The "unlock scoreboard" signal is optional, and may, for example, be implicit when a shader program completes writing data to the TLB 618. In this manner, overlapping pixel fragments may be rendered in a correct order. When a batch of data does not comprise pixel fragments that share fragments with one or more other batches of data, the batch of data may be written to the TLB 618 in any suitable order.

The scoreboard 660 may be utilized to prevent a plurality of QPUs 650, 652, 654 and/or 656 from accessing, for example, reading and/or writing, the same batch of overlapping pixel fragments at the same time from the TLB 618 for other types of processing such as stencil and/or depth processing.

In various exemplary embodiments of the invention, when rendering of a tile is complete, only a corresponding color buffer in the TLB 618 may be written to a frame buffer in main memory. When each tile has been written out of the TLB 618, the TLB may be cleared in preparation for rendering of another tile. Configuration of the TLB 618 and/or reading and writing of the TLB 618 to and from memory may be controlled by one or more control lists.

Figure 6B:
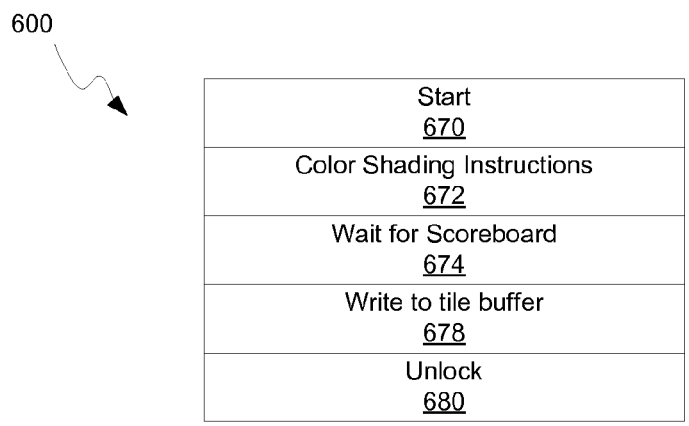
FIG. 6B is a diagram that illustrates exemplary fragment shading instructions for processing pixels utilizing scoreboarding, in accordance with an embodiment of the invention.

FIG. 6B is a diagram that illustrates exemplary fragment shading instructions for processing pixels utilizing scoreboarding, in accordance with an embodiment of the invention. Referring to FIG. 6B, there is shown a fragment shading program 600 that comprises a start instruction 670, a plurality of color shading instructions 672, a wait for scoreboard instruction 674, a write to tile buffer instruction 678 and an unlock instruction 680.

In operation, the fragment shader program 600 may be run on one or more of the QPUs 650, 652, 654 and/or 656, for example, the QPU 656. The fragment shader program 600 may begin with the start instruction 670. The plurality of fragment shading instructions 672 may determine color values for a current batch of pixel fragments that may be processed by the QPU 656. The number and/or type of fragment shading instructions may vary for different batches of pixel fragments and/or for different QPUs. Furthermore, a plurality of the QPUs 650, 652, 654 and/or 656 may run different fragment shading instructions in parallel on different batches of overlapping pixel fragments. When execution of the plurality of fragment shading instructions 672 is complete in the QPU 656, the wait for scoreboard instruction 674 may enable the QPU 656 to wait until all prior scheduled batches of overlapping pixel fragments are written to the TLB 618. Once the prior scheduled pixel fragments are written the TLB 618, the write to tile buffer instruction 678 may enable writing color values for the current batch of pixel fragments to the TLB 618. The unlock instruction 680 may enable a signal that may indicate to the scoreboard system that the QPU 656 has finished rendering all of its pixel fragments to the screen. After the unlock signal, other QPUs with subsequently scheduled overlapping pixel fragments may be written to the TLB 618.

The scoreboard system may utilize a table structure in memory, for example. When the fragment shading program 600 begins execution, for example, the scoreboarding system may determine and record which if any other fragment shading programs may already be running and shading pixel fragments that overlap one of more of the fragments in the batch that is about to be shaded. The scoreboarding system may then enforce waiting periods so that color shaded pixel fragments are written to the TLB 618 in a proper order.

Figure 7:
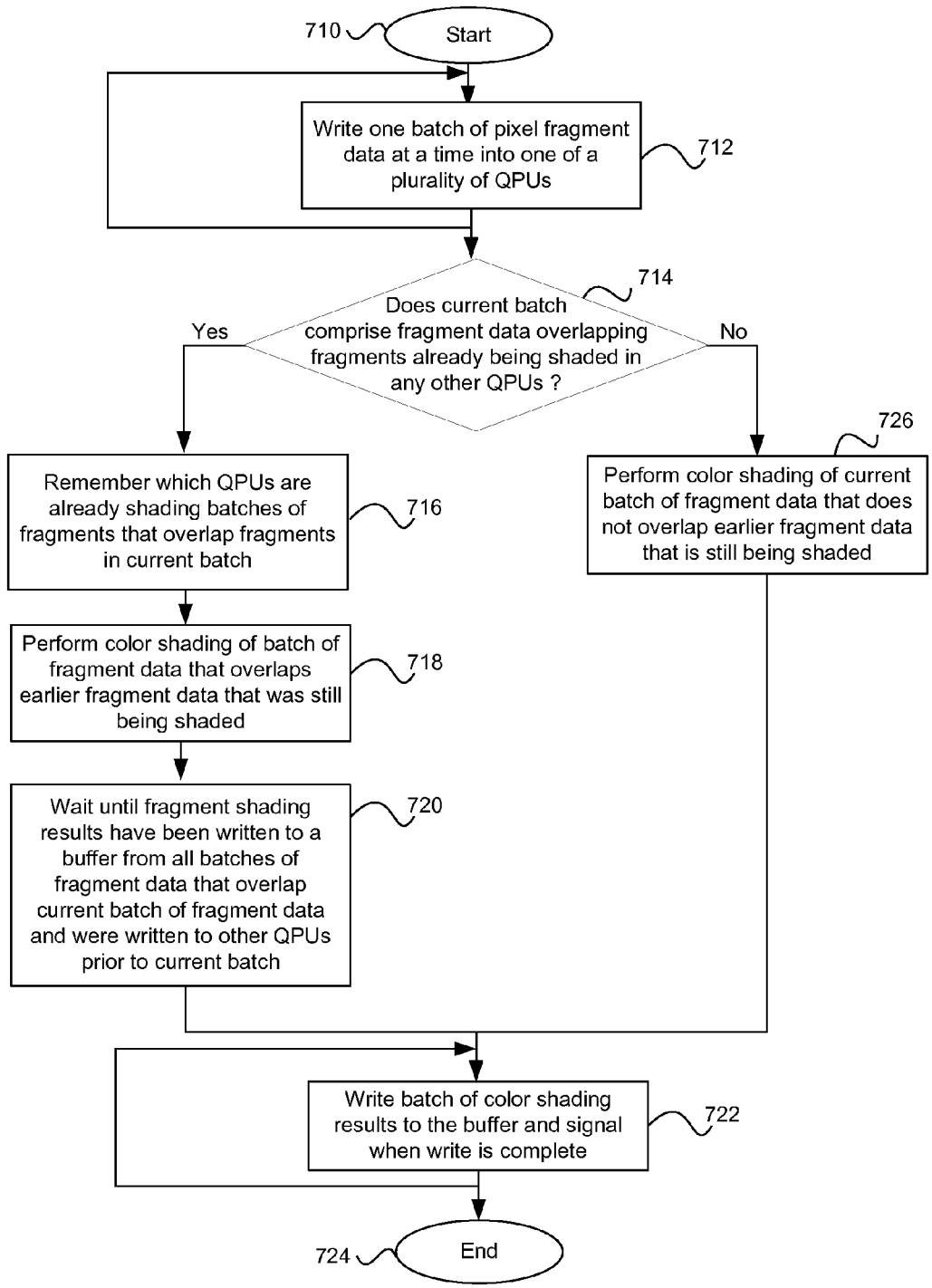
FIG. 7 is a flow chart illustrating exemplary steps for utilizing scoreboarding for fragment shading control, in accordance with an embodiment of the invention.

FIG. 7 is a flow chart illustrating exemplary steps for utilizing scoreboarding for fragment shading control, in accordance with an embodiment of the invention. The exemplary steps may begin at step 710. In step 712, one batch of pixel fragment data at a time may be written into one of a plurality of QPUs, for example, QPU 350. In step 714, in instances when a current batch of data comprises pixel fragment data that overlaps earlier pixel fragment batches that are still being shaded in one or more other QPUs, for example, one or more of the QPUs 352, 354 and/or 356, proceed to step 716. In step 716, the other QPUs that are already shading batches of pixel fragments that overlap the fragments of the current batch are recorded by the scoreboard 660. In step 718, fragment shading may be performed on the batch of data that comprises overlapping pixel fragment data. In step 720, fragment shading results for the current batch of data, may be delayed until all batches of data that comprise overlapping pixel fragment data and that were written to the other QPUs prior to the current batch, are written to the TLB 618. In step 722, the batch of fragment shading results from the given QPU, for example, the QPU 350, may be written to the TLB 618. A signal may be communicated when a write process is complete. The exemplary steps may end at step 724. In step 714, in instances when a current batch of data comprises pixel fragment data that does not overlap any earlier batches of pixel fragments that are still being shaded, the exemplary steps may proceed to step 726. In step 726, fragment shading may be performed on a batch of data that does not comprise pixel fragment data that overlaps earlier batches of pixel fragments that are still being shaded.

In an embodiment of the invention, a graphics processing device that comprises a plurality of processors, for example, the QPUs 350, 352, 354 and/or 356 and/or the QPUs 650, 652, 654 and/or 656, may be operable to process in parallel, batches of information for vertex and/or fragment shading. In instances when the batches of information comprise order-dependent data, the processing may comprise writing results from the processing to a buffer, for example, the TLB 318 and/or the TLB 618. The results from processing the order-dependent data may be written in an order that corresponds to an order in which the batches of order-dependent data are received for processing, for example, received by the QPUs 350, 352, 354 and/or 356 and/or by the QPUs 650, 652, 654 and/or 656. In instances when the batches of information comprise order-neutral information, the processing may comprise writing results from the processing, in any order, to a buffer, for example, the TLB 318 and/or the TLB 618. The batches of order-dependent data and/or the batches of order-neutral data may comprise pixel fragment data. The processing results may comprise color shaded pixel fragments. The order-dependent data may comprise spatially overlapping data. For example, spatially overlapping data may comprise pixel fragment data with common fragments. The order-neutral data may not comprise data that spatially overlaps earlier data that is still being processed.

A scheduler, for example, the scheduler 310 and/or 610, may be utilized to control an order of reception of the batches of order-dependent data and/or order-neutral data by the plurality of processors, for example, by the QPUs 350, 352, 354 and/or 356 and/or by the QPUs 650, 652, 654 and/or 656. The batches of order-dependent data and/or the batches of order-neutral data may be received one at a time, by each of the plurality of processors. The order in which the batches of order-dependent data are received by the each of the plurality of processors may be determined. All or a portion of the plurality of processors may process, in parallel, the one or more batches of order-dependent data and/or the one or more of the batches of order-neutral data. The writing order of the processing results from the plurality of processors to the buffer may be enforced, for example, by the scoreboard 660. One or more of the plurality of processors may be operable to write the results from processing in parallel, to the buffer in a specified order.

A portion of the plurality of processors may be instructed to wait before writing the processing results to the buffer in a specified order. The specified order may correlate to the order in which all or a portion of the batches of data are received by the plurality of processors. An indication or signal may be utilized to communicate when one of the plurality of processors completes the writing of results to the buffer. For example, the QPUs 350, 352, 354 and/or 356 may provide an indication or signal to indicate when they have completed writing a batch of pixel-fragment color values to the TLB 318. The graphic processing device may comprise an integrated circuit (IC) or a chip in which the plurality of processors may be integrated on a single substrate of the IC or chip.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for processing pixels utilizing scoreboarding.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing, the method comprising:
    in a graphics processor, processing in parallel batches of information for fragment shading, wherein said processing comprises:
        in instances when said batches of information comprise order-dependent data:
            processing said batches of information in parallel,
                writing to a buffer, results from said processing, wherein a processing completion order of the processing is different than an order in which said batches of order-dependent data are written to said buffer, said order of writing to said buffer being in the order that corresponds to the order in which said batches of order-dependent data were received for processing, and wherein the order of writing to said buffer is controlled by suspending writing from at least a portion of the processing in parallel; and
        in instances when said batches of information comprise order-neutral data, writing results from said processing, in any order, to said buffer.

2. The method according to claim 1, wherein said results from said processing comprises color shaded pixels.

3. The method according to claim 1, wherein said order-dependent data comprises spatially overlapping data and said order-neutral data does not comprise spatially overlapping data.

4. The method according to claim 1, comprising controlling by a scheduler, an order in which said batches of one or both of said order-dependent and said order-neutral information are received.

5. The method according to claim 1, comprising receiving said batches of information one batch at a time for processing.

6. The method according to claim 1, comprising determining said order in which said batches of order-dependent data are received for processing.

7. The method according to claim 1, comprising processing in parallel, of one or both of said batches of information comprising said order-dependent data and said batches of information comprising said order-neutral data.

8. The method according to claim 1, comprising one or more of sending and receiving an indication when said writing of at least a portion of said results from said processing in parallel to said buffer, is complete.

9. The method according to claim 1, wherein the order for the writing of the results to the buffer is suspended in response to a wait command received from a control module.

10. A system for graphics processing, the system comprising:
    a graphics processing device comprising a plurality of processors, said plurality of processors being operable to process in parallel, batches of information for fragment shading wherein said processing comprises:
        in instances when said batches of information comprise order-dependent data, write to a buffer, results from said processing in an order that corresponds to order in which said batches of order-dependent data are received for processing, wherein the order that the order dependent data is written to the buffer is controlled after in response to a processing completion of at least one of the plurality of processors being different than the order in which the batches of order-dependent data were received for processing; and
        in instances when said batches of information comprise order-neutral data, write results from said processing, in any order, to said buffer.

11. The system according to claim 10, wherein said results from said processing comprises color shaded pixels.

12. The system according to claim 10, wherein said order-dependent data comprises spatially overlapping data and said order-neutral data does not comprise spatially overlapping data.

13. The system according to claim 10, wherein said plurality of processors comprises a scheduler, and reception by said plurality of processors, of said batches of one or both of said order-dependent and said order-neutral information is controlled by said scheduler.

14. The system according to claim 10, wherein one or more of said plurality of processors are operable to receive said batches of one or both of said order-dependent data and said order-neutral data, one batch at a time.

15. The system according to claim 10, wherein one or more of said plurality of processors are operable to enforce a writing order for said writing of said results, from said processing in parallel, to said buffer.

16. The system according to claim 10, wherein one or more of said plurality of processors are operable to send and receive an indication when one of said plurality of processors has completed said writing said results from said processing in parallel, to said buffer.

17. The system according to claim 10, further comprising a control module operable to monitor and control the order that the order-dependent data is written to the buffer from at least one of the plurality of processors.

18. A device for graphics processing, the device comprising:
    a plurality of processors being operable to:
        receive batches of information for fragment shading comprising order-dependent data, the order-dependent data being received in a desired order; and process the batches of information for fragment shading in parallel among the plurality of processors, wherein a write order for each of the plurality of processors to a buffer is controlled after processing the batches of information by limiting a write access of each of the plurality of processors to the buffer.

19. The device according to claim 18, wherein the limiting the write access to the buffer is controlled in response to a processing completion order of at least one of the plurality of processors being different than the desired order in which the order-dependent data was received.

20. The device according to claim 18, wherein the write order for each of the plurality of processors to the buffer is controlled in response to a wait command that suspends access of at least one of the plurality of processors to the buffer.

* * * * *